United States Patent [19]

Matt

[11] Patent Number: 4,811,334

[45] Date of Patent: Mar. 7, 1989

[54] METHOD OF OPERATION OF A NODAL TELEPHONE AND DATA COMMUNICATION NETWORK TO PROVIDE SPECIFIC FACILITIES IN CHANGEABLE DOMAINS OF THE NETWORK

[75] Inventor: Jan P. Matt, Hilversum, Netherlands

[73] Assignee: U.S. Philips Corp., New York, N.Y.

[21] Appl. No.: 270,633

[22] Filed: Jun. 17, 1987

[30] Foreign Application Priority Data

Jul. 1, 1986 [NL] Netherlands .......................... 8601712

[51] Int. Cl.$^4$ .......................................... H01H 67/00
[52] U.S. Cl. ...................... 370/60; 370/62; 379/229; 379/230
[58] Field of Search .......... 360/60, 62, 58, 13; 379/211, 215, 229, 217, 230, 258, 269; 340/825.52, 825.03, 825.04

[56] References Cited

U.S. PATENT DOCUMENTS

| 4,445,171 | 4/1984 | Neches | 370/60 |
| 4,516,272 | 5/1985 | Yano | 370/60 |
| 4,561,090 | 12/1985 | Turner | 370/60 |
| 4,623,996 | 11/1986 | McMillen | 370/60 |
| 4,627,048 | 12/1986 | Larson | 370/60 |
| 4,656,622 | 4/1987 | Lea | 370/60 |
| 4,677,609 | 6/1987 | Piereth et al. | 370/60 |

FOREIGN PATENT DOCUMENTS 0224229  6/1987  European Pat. Off. .............. 370/60

*Primary Examiner*—M. H. Paschall
*Attorney, Agent, or Firm*—Thomas A. Briody; Leroy Eason

[57] ABSTRACT

A method of operation of a telephone and data PABX communication network which comprises a set of nodes interlinked by means of TDM-transmission lines. Each node serves an individual switching exchange and comprises its own control module. To a user the network is manifested as a single system. The invention flexibly sub-divides such a system, allowing the offering of fully integrated specific facilities within the boundaries of domains that can be arbitrarily defined within the total network configuration. Local data is provided in each node for a specific facility-bounded program which dictates the operation of a control module of the node. Such data contains an adjustable address file having the addresses of those nodes over which a call or a specific facility to which such program relates can be accepted. Nodes to which a specific facility is extended and whose addresses are incorporated in the file of each such node define a fully integrated domain wherein the relevant specific facility can be offered.

4 Claims, 3 Drawing Sheets

METHOD OF OPERATION OF A NODAL TELEPHONE AND DATA COMMUNICATION NETWORK TO PROVIDE SPECIFIC FACILITIES IN CHANGEABLE DOMAINS OF THE NETWORK

BACKGROUND OF THE INVENTION

1. Field of the Invention

The invention relates to a method of operation of a communication network, more specifically a PABX telephone and data communication network, which is composed of a set of nodes interlinked by means of transmission lines through which TDM-transmission is possible, a node comprising a switching module, one or more peripheral modules with user gates connected thereto, and a control module.

2. Description of the Related Art

Such a communication network is known from laid open Dutch Patent Application No. 8401443 which corresponds to U.S. Pat. No. 4,723,272, issued Feb. 2, 1988, to applicant herein, assigned to the present assignee. The object of these known networks is to achieve economic control of data for establishing a connection between users defined by a given source-destination relatonship. Therein a data set relating to the network is extended to the control module of a node. With such a data set it can be established by the control module to which this set is extended to what node a user gate, called the destination, is connected. If by referring to such a data set it appears that a user presented as a source unit and a user consequently called a destination unit are connected to different nodes, data relating to the identity and further characteristics of the source unit are transferred to the node of the destination unit. In addition, an outgoing path from this source unit is extended to this destination unit. Via this latter unit the final connection with the user called the destination unit can be accomplished. From further publications, for example Philips Telecommunication Review, Vol. 43, 1985, it is known that a communication network of the type described is manifested to a user as a single system, which applies to CP, SAS and PO (Call processing; system assurance; project engineering and operational maintenance). In other words such a communication network appears to be fully integrated.

SUMMARY OF THE INVENTION

The object of the invention is to provide a method of operation of a PABX communication network of the type hereinbefore described, in which specific telephone facilities can be offered fully integrated in a simple and economic manner within the limitation of domains which can be arbitrarily determined within the network configuration.

A method of operation of a communication network in accordance with the invention is characterized in that the local data is provided in each node for a specific facility-bound program which dictates the operation of the control module, the local data containing an adjustable address file of the addresses of those nodes via which a call for a specific facility for which said program is projected can be accepted. Nodes provided with the same specific facility are extended and theirs addresses are incorporated in the file of each such node so as to define for such nodes a domain wherein a relevant specific facility can be offered.

The invention offers the possibility of flexibly adapting such domains to the topgraphy of the files of potential users.

In other words, within one and the same total system, users can be subdivided into different groups, with each user group corresponding to the set of user gates of one or several nodes, thus creating a completely integrated domain in which nodes can be mutually isolated with respect to one or more specific telephone facilities.

Domains can be determined as desired, either ovelapping or not overlapping, either completely or partially. This can be done while setting up the communication network or during operation by means of POM.

BRIEF DESCRIPTION OF THE DRAWINGS

For further explanation of the invention several embodiments are described below with reference to the drawing, in which corresponding components are indicated by the same reference characters.

In the drawings.

DESCRIPTION OF THE PREFERRED EMBODIMENTS

Figures 1, 2:
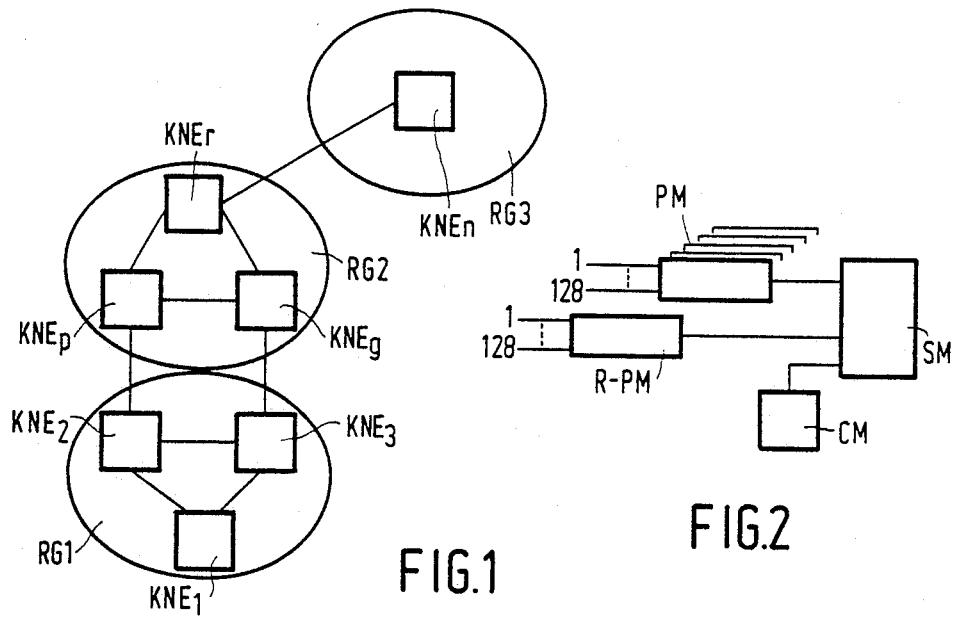
FIG. 1 is illustrative of a general block diagram of a PABX communication network of the type the invention relates to, and in which a set of nodes are interlinked via intermediary transmission lines.
FIG. 2 is a further detailed block diagram of one of the nodes comprised in the network according to claim 1.

In FIG. 1 a general block diagram is shown of a PABX communication network, more specifically a telephone network intended for private use of the type the invention relates to. Such a network, which is described in more detail in the aforesaid Philips Telecommunication Review, Vol. 43, 1985, generally comprises a plurality of nodes KNE 1, 2, 3, ..., n, chosen at will, interlinked by means of transmission lines enabling TDM transmission. More specifically, to this end use can be made of, for example 2 Mb/s transmission lines which can accommodate for example 30 PCM-channels via which the communication among the nodes can take place. These nodes can be installed spread over a geographical area selected as required, such as, for example an industrial area, a town, county(ies), etc. As illustrated in FIG. 1 by way of exmaple the nodes are spread over three regions RG1-3. In this connection, for example, one could think of a large company with several regional branches and for which such a communication network in its entirety is available.

Each node, more specifically a PABX, comprises, as is shown in more detail in FIG. 2, a switching module SM, a control module CM and a plurality of peripheral modules PM. Such a switching module comprises a digital non-blocking switching matrix and provisions for providing clock pulsing for the purpose of PCM-transfer. Such a control module performs the control functions required for the node itself and provides communication with other nodes. A peripheral module performs three processing functions, for example, signalling conversions, for a group of for example 128 user gates. A specific version of such a peripheral module R-PM, is available as a concentration unit distant from the relevant node, for a set of extension units, operator lines and trunk lines. For communication purposes with provisions that can be considered external with respect to a node, such a node can be designed comprising interfaces for analog transmission lines forming a coupling with public telephone switching systems, analog coupling lines to other PABX-systems, PCM-30 digital lines forming a coupling with public networks and networks for private use and which networks are suitable for specific kinds of signalling, and 2 Mb/s transmission lines allowing the use of signalling over a common channel (IMP) for communication with other nodes.

Each node of such a communication network is autonomous; the facilities are transparent throughout the network; and a completely free numbering is provided. The data incorporated in the system are generally to be subdivided into local data characteristic of a relevant node, and network data having more general features and being identical or the associated nodes with respect to content. In order to ensure data integrity for the entire network an updating mechanism is available for the purpose of the network data stored in each node.

Both for the purpose of operational maintenance (POM) and for the purpose of call processing (CP) data are mutually exchanged on a large scale between the nodes. This is possible via the 2 Mb/s transmission lines between these nodes and through which inter alia a 64 kb/s common signalling channel is made available. By means of an internal message protocol (IMP) the lower levels, indicated by 1, 2 and 3, of the internodal communication are attended to. Such a communication facility is also used for connections with the node itself such as the connection between a peripheral module and an associated control module. Within such a control module an input/output processor forming part of it attends to both the internal, the internodal communication and the message protocal processing.

For completeness' sake it should be observed that the configuration of a sub-communication network can be chosen at will. Such a configuration can have a star or mesh structure or a combination of the two as required.

Figures 3, 4:
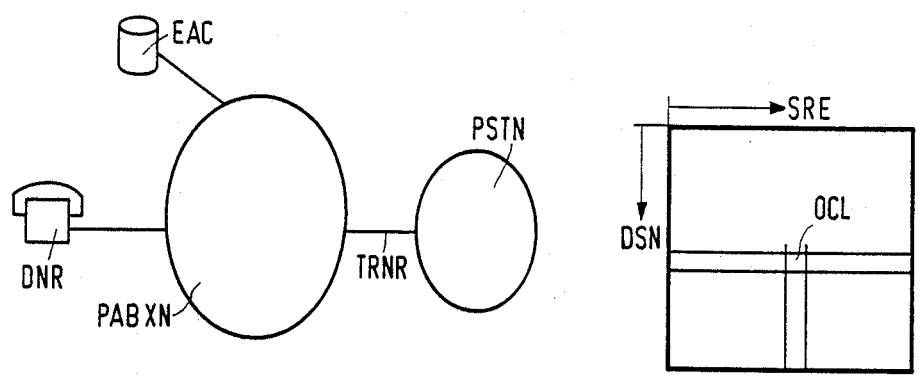
FIG. 3 is a diagram by way of illustration of several types of users which can be connected via gates to a communication network of the type represented in FIG. 1.
FIG. 4 is a diagram by way of illustration of a routing matrix for selecting a transmission channel giving access to a destination unit.

The routing, for forming a path through the communication network between the source unit and a destination unit, generally consists of two parts. In the first part the node is identified to which the required destination unit is connected, and in the second part the connection is established via transmission lines. For completeness' sake it should be observed that it need not always be a matter of a physically switched connection; a so called virtual connection is also possible, over which data exchange has to be routed. To be able to determine to which node a requested destination unit is connected an identity is assigned to each destination unit. For example, extensions are defined by directory numbers (DNR); trunks are collected in route with a route number TRNR, and external sets are provided with a name code EAC. All this is schematically shown in FIG. 3, in which a PABSN and a PSTN are represented by way of example.

The identity of each destination unit is stored and the identity, i.e. the address, of the node to which the relevant destination unit is connected. As is the case for extensions and routes, for example, such interrelated data are part of the network data. The identity of a called destination unit is then unique in the total network.

In the scope of the present invention relationships of the same kind, more particularly specific destination units and related node addresses, are incorporated in the local data stored in a relevant node. This implies that such a specific destination unit will be exclusively available to the node in which is stored the address of this destination unit. In other words, the local data are organized such that viewed from a particular node the local data stored therein contains address data relating to the nodes via which a specific destination unit can be reached from that particular node. This boils down to the fact that local data available in a node for the benefit of a specific facility-bound program, contain an adjustable address file of those nodes via which a call for a specific facility for which said program is scheduled can be accepted. Nodes to which an identical specific facility is extended and whose addresses are incorporated in the file of each such node will then define a domain for such a node, in which a relevant specific facility can be offered. In other words such a domain can be defined as a sub-set of nodes selected from the total set of nodes and having a certain specific destination unit in common. This matter will be discussed hereinbelow in further detail in view of specific facilities such as operator assistance, call answering night service and paging.

After a node is found via which a requested destination unit can be reached, the connection required for the call is established link by link. Thereto the node to be qualified as a source selects an outgoing channel of this node by using a routing table, extending the call via that channel. If an intermediate node receiving the thus extended call has not found the requested final destination unit in its network data file, this intermediate node again selects an outgoing channel and again a routing table is used. This matter is schematically illustratated in FIG. 4. This selection depends on the destination unit qualified as a source in first instance and the final destination unit. In such an intermediate node difference paths can be established to the same destination unit independence on the source.

Arrangements are extended to each node by which it can be checked whether all other nodes belonging to the network can be reached. If a specific node can no longer be reached via a specific path, the existing connections and relationships to reach the relevant node will be broken off and/an alternative path to reach the relevant node will be defined via the routing table.

Figure 5:
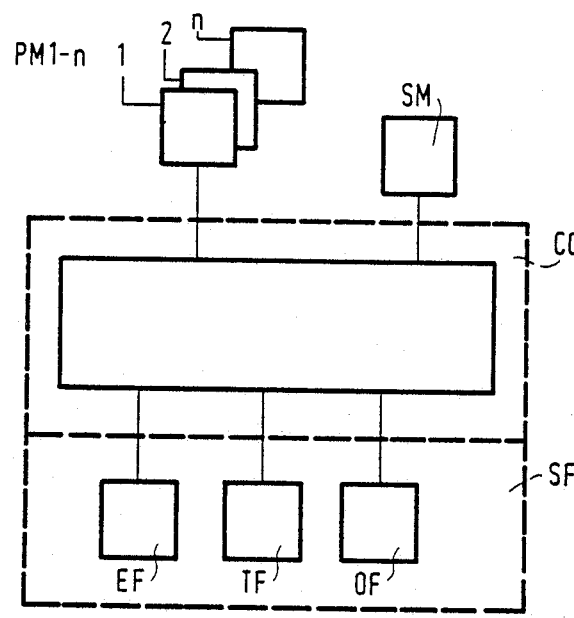
FIG. 5 is a diagram by way of illustration of software structure related to call processing.

The software available to call procesing (CP) is composed of two parts as schematically represented in FIG. 5, namely call control CC and specific facilities SF. The CC part available to call processing contains the logic required for processing different kinds of calls. This part is structured as a mechanism where the changes from the one to the other status are initiated by external events.

With call processing the data incorporated in the system are controlled by specific facilities. For each data class such as for example extension data, operator data, trunk data and so on, there is such a specific facility. The individual specific facility-bound processes provide direct interfaces to other software components, such as call control and operational maintenance. Within the framework of each specific facility the data can be subdivided into local data and network data. With call control the following communication lines can play a part:

Call control-call control.

Such a communication line plays a part in establishing or breaking off the connections between the nodes and is based on the SS7 scheme. The signalling comprises messages with functions such as occupation, confirmation of occupation, address messages and so on.

Call control-specific facilities extended to a further node.

This relates to an indirect communication line. Call control uses here a communication handling unit (CH) asking for information - and exchanging answer -messages with the control module (CM) in the associated other node (facility-bound messages or virtual calls). A receiving communication handling unit (CH) sees to the transfer from and towards the relevant specific facility. This form of communication is used for starting/setting back dynamic relationships such as "initiate follow me", "automatic ring back", and so on.

Specific facility-specific facility.

Figure 6:
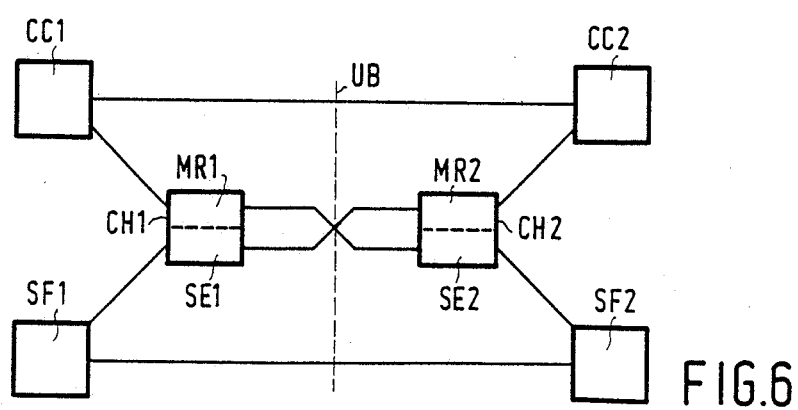
FIG. 6 is a diagram by way of illustration of several types of communication which are usable for call processing (CP)

This relates to a direct communication line which among other things is used for exchanging status changes of gates. This matter is illustrated in FIG. 6 in which these different kinds of communication lines are shown.

In a communication network of the type hereinbefore described the local data are organized in accordance with the invention so that the local data available in a node for a specific facility-bound progam, as a result of which a particular operation of a control module can be dictated, contain an adjustable address file having addresses of those nodes via which a call can be accepted for the specific facility for which said program has been projected. The latter nodes form a sub-set or in other words a domain. A relevant specific facility can only be offered from a domain to a node extended to the relevant domain.

By organizing the local data in this way and dividing them over the plurality of nodes, both supply and demand of specific telephone facilities can be linked with the limitations of domains or sub-sets which can be arbitrarily chose by its users within the totality of the communication network and which can be changed again at any moment in a simple way. For example, one or more such arbitrarily selected domains or sub-sets of nodes can be projected to offer a specific facility or destination terminal, to be regarded as common to those nodes, to one or more arbitrarily selected sub-sets of nodes capable of initiating a call for such a specific facility. For completeness' sake it should be observed in this connection that the latter sub-sets (calling unit) and the former sub-sets (destination unit) can be either the same or different. In other words a flexible adjustment is possible to the topography of the group of potential users of the communication network.

This matter will hereinbelow be further explained by way of illustration with reference to several specific telephone facilities. These facilities can be referred to as "operator-assistance"; "call answering night service"; and "paging".

In a communication network of the type this invention relates to, operator-assistance units can arbitrarily be extended to the nodes comprised in the communication network; more specifically, such operator-assistance units can either be extended collectively to one node, or distributed over the nodes of the network. From each node a user connected thereto can dial such an operator assistance unit by transmitting a general access-code. When a call coming in via a trunk line appears to need operator assistance, for example, because the called extension number has not answered after a predetermined time interval has elapsed, this call is automatically routed to an operator assistance unit. In an operator assistance unit the signalling with respect to calls coming from the node to which the relevant operator assistance unit has been extended and calls coming from further nodes is identical.

Figure 7:
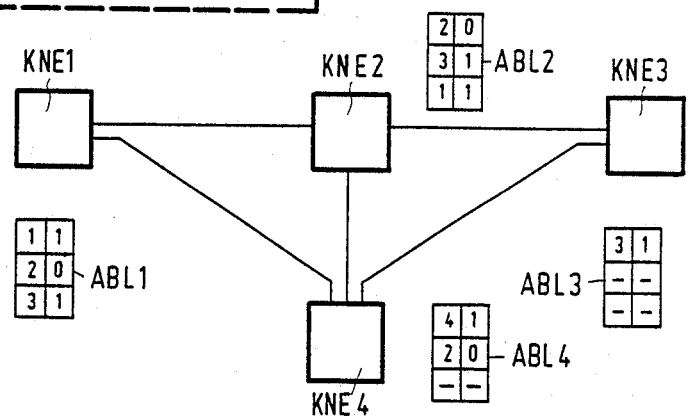
FIG. 7 is a diagram of a network configuration of four nodes and with reference to which a specific facility of the kind known as operator assistance is discussed in the scope of the invention.

Besides the possibility of establishing a connection with a desired operator assistance unit by transmitting an extension number (DNR) by which an operator assistance unit can be reached, the operator assistance potential can be enlarged at will with a communication network in accordance with the invention in those situations in which a call has to be routed automatically to an operator assistance unit. After an offered call has been found to be in need of operator assistance according to a procedure known per-se, in first instance a node has to be dialled where such an operator assistance can actually be offered. Thereto the local data available in a node where the call is offered contain an address file for the purpose of the program projected for the specific facility of "operator assistance", such address file having the addresses of those nodes from where operator assistance can be offered, the addresses in the address file of nodes to be considered the source of such a call being arranged in a specific order of priority. In addition, to each address in such an address file a characteristic is added indicating whether the relevant node is available to actually render the required operator assistance. A routing algorithm, projected for the purpose of this facility of operator assistance, then sequentially examines the availability of nodes occurring in the relevant address file starting with the address of the highest priority as a consequence of the relevant call. This matter is schematically shown in FIG. 7. FIG. 7 is illustrative of an embodiment of a communication network having four nodes KNE1-4. In this Figure for each one of the nodes the said address file with relevant availability characteristics is shown schematically. For the node KNE1, for example, nodes KNE1, KNE2 and KNE3 are projected to be able to render operator assistance to this node KNE1. When a call has arisen in this node KNE1 requiring automatic routing to an operator assistance unit, the appropriate nodes will be examined in the sequence of KNE1, KNE2, KNE3. If such assistance in the node KNE1 is not available, as shown in the Figure, in other words the operator of that post is absent, the next node KNE2 will be examined under the control of the routing algorithm initiated in node KNE1. Seen from node KEN1 in this example, the nodes KNE1, KNE2 and KNE3 form a domain from where the specific facility of operator assistance can be offered. In a similar manner, for example, seen from node KNE4 a sub-set or domain is defined by the nodes KNE4 and KNE2. At regular intervals the addresses in such address files are examined so as to check whether the associated availability characteristics indicates whether the relevant node is able or not able to render the actual operator assistance. If all the operators of an operator assistance unit are absent the availability characteristic of that unit is marked as passive ("1"), whereas, if there are operators at the relevant unit the said characteristic is marked as active ("0").

The order in which the addresses of the nodes are arranged in such an address file is also the priority order in which the relevant nodes are examined for availability of operator assistance.

Figure 8:
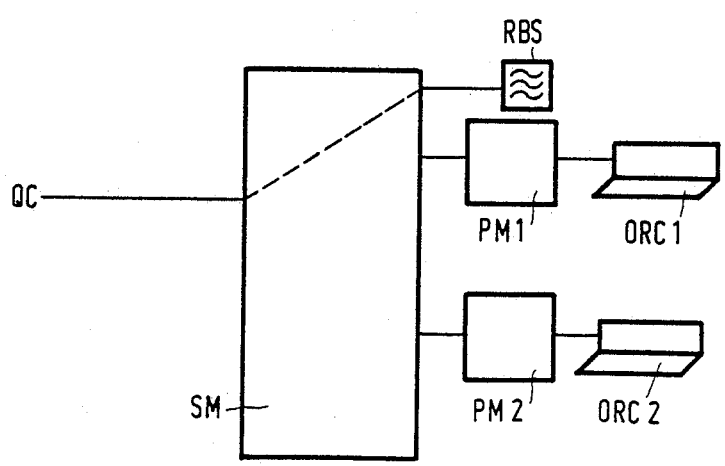
FIG. 8 is a diagram of a configuration by means of which queued calls can be provided with a ringback tone.

The routing algorithms projected for this facility are structured such that as a consequence of the call requesting automatic selection of an operator assistance unit, in the first instance an examination is made inside the node whose address is shown at the top in the address file of the node which has requested operator assistance. In this node it is then checked whether the relevant operator assistance unit is staffed. If it is not staffed this message is passed on to the node from where the request for operator assistance originated. There the address file is updated and the next node from where operator assistance can be rendered is examined. If an operator assistance unit which is extended to a node assigned as destination unit is staffed indeed, a call offered to that unit is queued. The nature of such a call determines the order in which the operator will arrange the call in queue. At the same time an attention signal should be given to the caller. As it is not sure at the moment when this signal is started which operator will answer, this signal cannot be offered from a peripheral module. In this connection, on starting up a node, permanent paths are provided from the attention signal source of one or more peripheral modules to the switching module of this node. Subsequently, the queued calls are connected to one of these attention signal sources. This matter is schematically illustrated in FIG. 8.

When in an operator assistance unit the last operator has left, the queued calls are returned to the node from where the call for operator assistance has originated, enabling the search for an alternative node from where operator assistance can be rendered.

Each node is likewise designed to request at regular intervals the operator status of the nodes whose addresses are included in the relevant address file. Thus, the fact that an operator assistance unit extended to a specific node is staffed or not staffed can be made known to all nodes involved.

When there are no operators present in the operator assistance units of all nodes of a sub-set from where operator assistance can be rendered, the relevant domain is in the so-called night condition. This implies that the address files of the nodes in this domain which are assigned to provide operator assistance, are all passive, in other words for all availability characteristics a "1" is marked.

For those nodes whose address files are identical as regards their content, the change from day to night condition or vice versa takes place simultaneously. For example in FIG. 7 KNE1 and KNE2.

For completeness' sake it should be observed that in a communication network in accordance with the present invention so-called DDO-routes can be distributed according to traffic whereas on the other hand so-called DDI-traffic and calls which are retoured to operator assistance can be distributed according to the relevant operator assistance units.

DDO calls (direct dialling out) are calls from an extension of a sub-communication network to a further network for example a public switching telephone network (PSTN). The trunk lines leading to such a PSTN can be connected to a single node or be distributed over several nodes. When having a limited number of lines distribution is problematic. For the sub-groups are relatively small which is unfavorable on grounds of efficiency.

When a DDO-call is led to a node to be regarded as the exchange, either direct or via a node performing a transfer function, all associated nodes aer affected as regards their load. To keep these effects within limits without increasing the change of congestion, an overflow facility is projected. This means that two options can be defined per node. A first option for example is the lines connected to the node itself, a second option being the lines connected to a further node. This matter is further illustrated in the diagram according to FIG. 9. To this end the trunk lines allowing of access to an external network are collected in routes. The trunk lines of a specific route can only be connected to a single node, whereas several routes can lead to the same destination terminal.

The DDO-destination unit is dialled by the caller by means of an access-code. Such a code is the same for all nodes of the communication network and therefore, such a code forms part of the network data. With the local data added to the node two routes can be linked with such an access-code. Consequently, these routes can differ for each node. The routes are identified by a unique route-number. The network data comprise the relationship between route number and node address so that in each node it is known to which node a specific route is connected.

After an access code is dialled a path is established to the node to which the route is connected in the first option. In this node a free outgoing line in this route is selected. After such a free line is found the connection is made. However, if no free line can be found this is reported back to the node functioning as a source after which the second option is examined from there. If this attempt fails too the caller will receive the congestion tone. In connection configurations with a so-called hold node (the node having functioned as the first destination unit and from where the choice of a second destination unit is made) the outgoing route is selected from this hold node.

Figure 9:
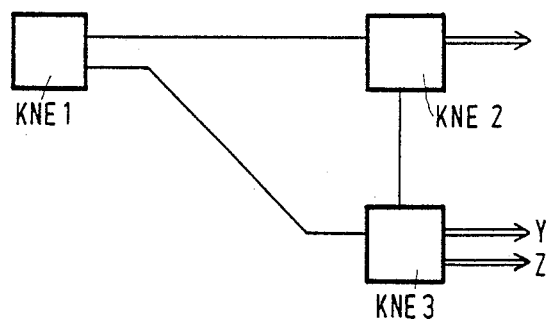
FIG. 9 is a diagram by way of illustration of the manner in which alternative routes for a node can be created.

The configuration shown by way of example in FIG. 9 comprises three nodes KNE1–3. The node KNE2 gives access to the route x, the node KNE3 disposing of routes y and z. These data are contained in the network data of the relevant nodes. The local data of these nodes are structured as follows: a first choice for KNE1 is route x and a second choice is route y; a first choice for KNE2 is route x and a second choice is lacking; a first choice for KNE3 is route y and a second choice is route z.

The so-called DDI-calls (direct dialled in) are calls coming from a PSTN or further networks, to an extension of a relevant communication network in accordance with the invention. Situations may occur in which a selected destination terminal cannot be reached as either the number is not connected or the selected destination terminal is busy, or the selected destination terminal does not replay. Under these circumstances it is possible to route the relevant DDI trunk line to an operator assistance unit. A large portion of the DDI-traffic will require operator assistance. In this connection it is advisable to define the DDI-trunk lines according to connected operator assistance units. This will restrict throughout traffic. Based on considerations relating to reliability, however, a configuration can also be chosen in which such trunk lines are distributed over the network.

Generally, there are a number of specific facilities of a communication network closely related to geographical and topographical conditions, respectively, under which the network has to be used. For example, the position of a porter's lodge can affect the organization of the night traffic. In this connection, for example, the alarm horn for the facility referred to as call answering night service should be audible where necessary, allowing of responding to or not responding to the alarm horn from geographically separated areas.

On the other hand it may be necessary for the purpose of the specific facility referred to as paging to cover with this facility a network distributed over several areas distant from each other and to use several pagers.

Such two specific facilities will hereinbelow be further described by way of an embodiment.

With respect to the handling of night traffic different requirements can be made as to the installation of alarm horns for call answering night service and as to the night sets. In this connection the organization for handling night traffic is sub-divided into provisions for selecting a night set and provisions for controlling the call answering night service. Thus, it is possible to choose an extension for night set whereas the node this extension is connected to is in day condition as regards operator assistance. Since it cannot be ascertained in this "night set" node which service category is applicable, a call from a node in the night condition will be accompanied by details about the service category transmitted from the source node or the hold node. Thereto the local data of each node contain an indication on service category per level of night service. The different levels are: individual night extension (INE); sub-common night extension (SCNE); main common night extension (MCNE); and common answering night service (CANS). Selecting a night set is possible as with an incoming line at INE-level a directory number (DNR) is given. By storing a certain DNR with several lines a "common" INE has arisen. A suchlike structure can also be applied for SCNE and MCNE, but then at the level of a route and a node, respectively. More specifically, an SCNE can be related to a route and an MCNE to a node.

When a night set is selected in the first instance the INE is examined, then the SCNE and subsequently the MCNE. Selecting a higher level than that of SCNE or MCNE may be required owing to:

(a) INE (SCNE) not being defined;

(b) INE (SCNE) being switched absent: and (c) not timely answering by the lower level night set.

Selecting INE, SCNE or MCNE is initiated from the node to be qualified as the source node or as the hold node. Internally generated calls are led direct to the MCNE.

When all the levels projected for dealing with night traffic have been passed through without the night call having been answered, the specific facility indicated as common answering night service can be activated. It is important here which alarm horns in the network have to be activated and from which nodes of this network it must be possible to answer such a "CANS call". The geographical/topographical lay out of the communication network plays a major part herein. If, for example, two different companies jointly run a common network considered at large to be one and the same, as a rule it is desired that a night call intended for the one company cannot be answered by the night watchman of the other company and vice versa. More specifically, with each relevant node a definition is given relating to the domain or sub-set of nodes from where a call requesting common answering night service can be answered. To such a node a waiting list is extended with calls requesting this facility of common answering night service, only entered on the waiting list of the node to be considered source of such a call, in the order they come in. A routing algorithm, extended to this facility, consequent on a request for this facility, will simultaneously inform nodes whose addresses form a relevant sub-set, that such a request has been made and send along the address of the node to be considered the source of the request. For example, seen from a node KNE1, if a domain is defined comprising nodes KNE2 and KNE3 a call for CANS initiated from this node KNE1 can only be answered from this domain by the nodes KNE2 and KNE3. In other words a call cannot be answered, for example, from nodes KNE4 and KNE5 which do not belong to the communication network as such but which do not belong to the aforesaid domain defined for node KNE1. In a suchlike manner a CANS call for example initiated from a node of a domain comprising KNE4, KNE5 and KNE6 can only be answered from the latter domain. In the two said cases the routing algorithm initiated from the node to be considered source will have the nodes of the relevant domain informed simultaneously that such a call has arisen, likewise having the address sent of the node to be considered call source. The alarm horn extended to the relevant domain is activated as a consequence of such a message leaving night watchmen present inside this domain to answer such a call as a reaction to such an alarm signal via the nearest telephone set by dialling a CANS pick-up code. When answering takes place in this manner the calls registered in the waiting list of the node to be considered call source are dealt with in the order they have come in. When such a waiting list has been gone through the waiting lists of further nodes forming part of the relevant domain are likewise dealt with in the order the calls have come in. When answering a CANS call, the service category of the CANS level is available for the relevant call in the node to be considered source or hold node.

After all calls have been removed from a waiting list of a node, either by answering or by giving-up the attempt to call, the nodes of the relevant domain will be informed, avoiding the node being scanned after a possible initial dialling of the relevant CANS pick-up code.

Figure 10:
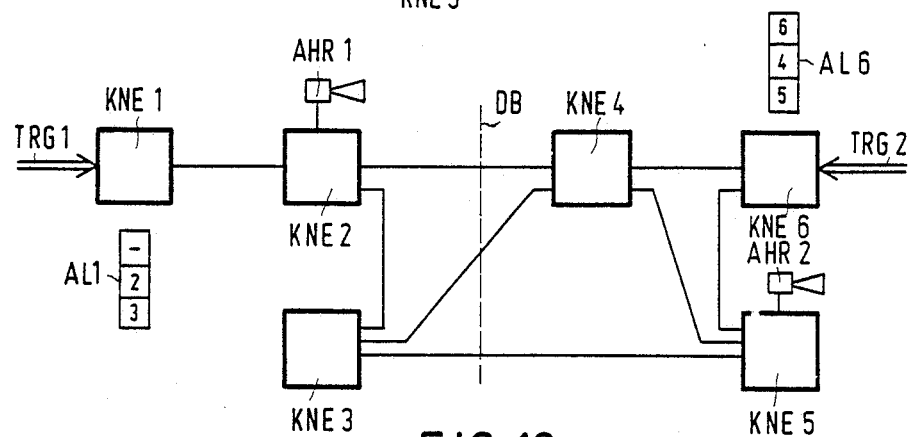
FIG. 10 is a diagram of a possible embodiment of the communication network and, by way of illustration, of a specific facility of the type known as common answering night service (CANS) as it can be applied in the scope of the invention.

FIG. 10 is an illustration of the configuration described hereinbefore by way of embodiment, comprising the sub-sets or CANS domains of nodes KNE2, KNE3 and KNE4, KNE5, KNE6 respectively. Seen from the nodes KNE1 and KNE6, respectively, to be considered call initiators, the domain extended thereto comprising the sub-sets of nodes KNE2, KNE3 and KNE4, KNE5, KNE6, respectively, functions as one node with regard to this specific facility of the type referred to as anwering night service.

As is the case with the facility described hereinbefore of the type referred to as operator assistance, also with the common answering night service facility the node from which a call originates can be regarded as a star point from where a call is distributed selectively over the sub-set of nodes defining the relevant domain designated to the star point.

To further illustrate the invention a description will be given hereinbelow of the specific facility of the type preferred to as paging. In analogy of the matters discussed hereinbefore a total set of nodes the communication network is composed of can be arbitrarily divided into sub-sets of nodes from where a call for this specific facility of "paging" can be answered. To each such domain is added a separate call transmitter which can be activated from a single node. This facility of the type referred to as "paging" has in common with a previously described facility of the type referred to as CANS the call pick-up function from a set to be answered. Unlike the latter facility, in which the calls are processed in the order as they come in, in the facility referred to as paging, at any rate the one where the calls can be answered from the normal telephone set, the calls are processed selectively. Thereto a waiting list is extended to the relevant node coupled with the call transmitter, in which waiting list calls for this facility are registered in the order they come into the relevant domain, and stating the address of the user gate from where such a call originates. The routing algorithm assigned to this facility referred to as paging is structured such that the calls registered in a waiting list are examined selectively and the shortest possible connection is realized between the user gate of the called party and that of the calling party. When a paging is initiated the node where the waiting list is in which the address of the source of the call has been entered should be known. Thereto a unique access-code has been added to each one of the "paging" domains projected in the communication network. In addition, such an access-code is provided with the specific route in its turn laying down the relationship with the node to which the relevant call transmitter and waiting list have been extended. After the dialling information is transmitted relating to the paging access-code, a speech connection is set-up to the node from where the relevant call transmitter can be activated. Dependent on the hardware used the digits following the access-code and used for identifying the called extension are transmitted by this transmitter, the call allowing of answering either via a normal telephone set and only via wire transmission or via a mobile telephone set of the called party. Unlike the answering procedure with the facility of the type referred to as CANS, it should be made known, in addition, when answering a paging of the type referred as "meet me" which call is meant. In the waiting list extended to the relevant call transmitter several calls waiting for the "meet me" answering can be registered, whereas answering has an individual character. Such an identification is realized by means of the digit series indicating the extension number of the called party. This implies that with the answering procedure the same digit series has to be transmitted after the pick-up access-code as with the call itself. The digits dialled by the call initiator are stored in the node to be considered source and also in the node from where the call transmitter can be activated. In the node to be regarded as a source the identity of the caller himself is added to this digit series. In the node which can activate the relevant call transmitter, the address of the node to be regarded as a source is related to this digit series.

Nodes from where a paging can be answered are combined into one domain. Such a sub-set is defined because the address of the node by which a relevant call transmitter can be activated is incorporated in the local data of the relevant nodes.

To answer a transmitted paging the answering party initially dials the pick-up access-code followed by the digit series representing the called party's identity, all this being returned via a wire connection to the node which activated the call transmitter. The routing algorithm assigned to the facility in question is structured such that the digit series transmitted by the call initiator is searched in the waiting list of the latter node. If this search is successful the address of the node to which the call initiator is connected is returned to the node from where the answering party has reacted. This routing algorithm provides a speech path along 2 the shortest possible way from the latter node to the node to which the call initiator is connected. There the call initiator is found with the aid of the relevant digit series and a "meet me" connection is achieved. Subsequently, the information required for establishing this connection and stored in the call initiator node on the one side and in the call transmitter (shadow file) node on the other is erased.

Figure 11:
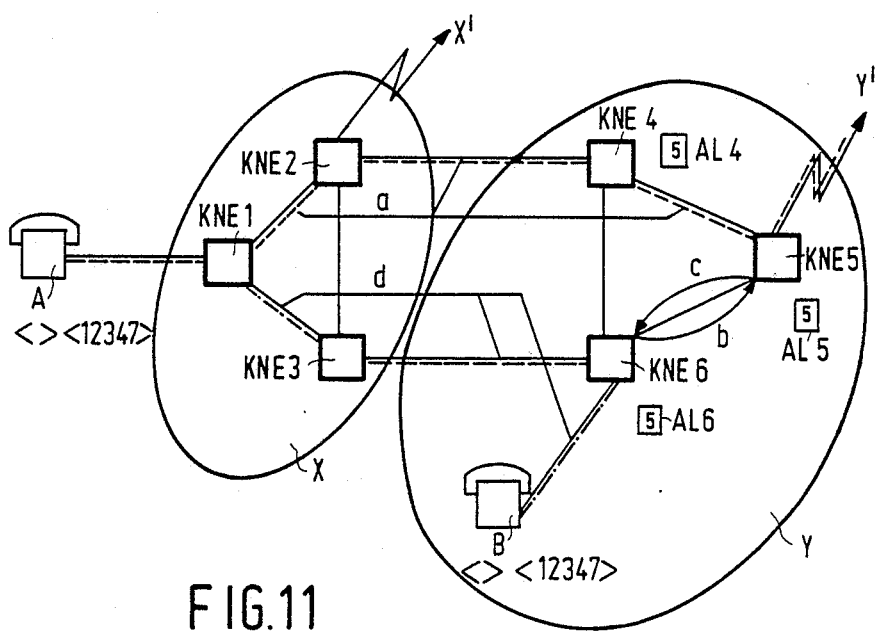
FIG. 11 is a diagram of an embodiment of a communication network and with reference to which a specific facility of the type indicated by paging, more specifically, "call . . . me" will be discussed in the scope of the invention.

This matter is illustrated by way of embodiment in FIG. 11. This figure represents two domains of sub-sets of nodes from where a call for the facility of the type referred to as paging or more specifically "meet me" call can be answered. These domains are indicated in the Figure by x and y, respectively, and comprise nodes KNE1-4 and KNE4-6, respectively. In addition, a call transmitter is added to nodes 2 and 5, respectively, which is indicated by the drawn arrows x' and y', respectively. It is assumed that an extension to which party A is connected wishes to set up a telephone connection with a person referred to as party B in the domain y. Thereto party A sends the access-code for the domain y followed by a digit series referred to in the Figure as 12347, representing the identity of party B. By sending the access-code a connection is formed from party A via the nodes 1, 2, 4 to node 5 with the call transmitter extension in the relevant domain y. This connection is indicated in the Figure by a broken line and by the reference character a. This activates the call transmitter y' and the identity number of party B is transmitted. The receiving set party B is carrying is activated and party B can in the first instance set up a connection with node 5 via a nearest telephone set. Thereto party B dials the pick-up access-code followed by its identity number in this case 12347. As a result of this action via node 6, whose telephone set party B utilized, a connection is formed with this node 5, which is indicated in the Figure by the arrow with reference character b. In this node 5 the waiting list available there is checked and the number carried by the call initiator of party B is searched. If this search procedure is successful the address of node 1 is returned from node 5 to node 6. This is indicated by the arrow c. Thus a connection is established from this node 6 along the shortest possible way to the node 1. In the Figure this connection is indicated by the dash-and-dot line d running via node 3. Subsequently, the identity of the caller is searched in the waiting list of this node 1 so as to complete the connection between the parties A and B.

The embodiments of the invention discussed hereinbefore are not limitative. For different facilities, domains inside a communication network of the relevant type can be defined arbitrarily and in a similar manner.

LEGENDS

FIG. 1:

KNE1, KNE2, . . . , KNEp, . . . KNEn nodes
RG1, RG2, RG3, regions

FIG. 2:

SM switching module
CM control module
PM peripheral module(s)
R-PM remote peripheral module

FIG. 3:

DNR directory number extension
EAC external set with external code
TRNR trunk route with route number
PABXN communication network of several PABX units
PSTN public telephone switching network

FIG. 4:

SRE source address
DSN destination address
OCL outgoing channel address

FIG. 5:

CC call control
SF specific facilities
EF extension facilities
TF trunk line facilities
OF operator facilities
SM switching module
PM1-n peripheral modules 1 .. n

FIG. 6:

CC1 call control for node 1
CC2 ditto for node 2
CH1 communication handling unit for node 1
CH2 ditto for node 2
MR1 "master" part of CH1
SE1 "slave" part of CH1
MR2 "master" part of CH2
SE2 "slave" part of CH2
SF1 specific facility extended
SF2 ditto for node 2
UB ultimate boundary between the nodes

FIG. 7:

KNE1-4 nodes
ABL1-4 address/availability lists

FIG. 8:

PM1,2 peripheral modules
SM switching module
ORC1,2 operator assistance units
RBS ringing bell source
QC queued calls

FIG. 9:

KNE1-3 nodes
x route x
y route y
z route z

FIG. 10:

KNE1-6 nodes 1-6
TRR1, 2 trunks 1, 2
AHR1, 2 alarm horns 1, 2
DB domain boundary
AL1 address file of KNE1
AL6 address file of KNE6

FIG. 11:

KNE1-6 nodes 1-6
A, B extensions A, B
x, y domains x, y
AL4-6 address file of nodes 4-6
a,b,c,d wire transmission paths
x',y' wireless call transmission.

What is claimed is:

1. A method of operation of a PABX telephone and data communication network comprising a set of nodes interlinked by TDM transmission lines; each node comprising a switching module, one or more peripheral modules with user gates connected thereto, and a control module; such method comprising:
   providing local data in each node of a subset of said set of nodes, such local data controlling the operation of the control module in the relevant node to provide a specific facility-bound program;
   including in the local data in each node of said subset an adjustable file of addresses of nodes in said network at which a call for said specific facility can be accepted;
   and incorporating the addresses of all nodes in said subset in the address file of each of such nodes, to thereby define a domain wherein said specific facility is made available to nodes listed in the address files of the nodes in said subset.

2. A method as claimed in claim 1, wherein at least one subset of nodes in said network define a domain for providing the specific facility "operator assistance", and further comprising:
   in the address files of said subset of nodes, arranging the addresses of nodes which are the source of a call for said facility in an order of priority, the highest priority being assigned to the first address in such order;
   adding a characteristic to each address in said prioritized order of addresses indicating whether the node to which such address applies is available to offer said facility; and
   assigning a routing algorithm to said facility which causes the availability of nodes in the address file of a node in said subset to be sequentially examined in response to a call transmitted to such subset node, starting at the address of the highest priority.

3. A method as claimed in claim 1, wherein at least one subset of nodes in said network define a domain for providing the specific facility "common answering night service", and further comprising:

establishing in the address file of each of the nodes in such subset a writing list of addresses of nodes from which calls are received requesting said facility, such addresses being entered in the order in which such calls are received; and assigning a routing algorithm to said facility which, in response to a call requesting said facility simultaneously informs the nodes in said subset that such a request has been made and sends to such nodes the address of the node regarded as the source of such call.

4. A method as claimed in claim 1, wherein at least one subset of nodes in said network define a domain for providing the specific facility "paging", and further comprising:

providing a single node in said subset with a call transmission arrangement which can be activated from such node;

establishing in the address files of each of the nodes in said subset a waiting list of the addresses of user gates from which calls are received requesting said facility, such addresses being entered in the order such calls are received, starting with the address of the user gate at which such a call was first initiated; and assigning a routing algorithm to said facility which selectively searches the user gate addresses in such waiting list and establishes the shortest possible connection between the user gate of a called party and that of the calling party.

* * * * *

UNITED STATES PATENT AND TRADEMARK OFFICE
CERTIFICATE OF CORRECTION

PATENT NO. : 4,811,334

DATED : March 7, 1989

INVENTOR(S) : Jan P. Matt

It is certified that error appears in the above-identified patent and that said Letters Patent is hereby corrected as shown below:

On the Title Page, Item [21],
After Appl. No.: change "270,633" to --063,367--.

Signed and Sealed this

Fifth Day of September, 1989

Attest:

DONALD J. QUIGG

Attesting Officer

Commissioner of Patents and Trademarks